United States Patent
Borda et al.

(10) Patent No.: US 8,431,097 B2
(45) Date of Patent: Apr. 30, 2013

(54) SOLUTE PRECIPITATION METHOD AND DEVICE

(75) Inventors: Gilles Borda, Bagnois sur Ceze (FR); Jean Duhamet, Bagnois sur Ceze (FR); Florent Gandi, Saint Andre d'Olerargues (FR); Jean-Yves Lanoe, Laudun (FR)

(73) Assignee: Commissariat a l'Energie Atomique, Paris (FR)

( * ) Notice: Subject to any disclaimer, the term of this patent is extended or adjusted under 35 U.S.C. 154(b) by 266 days.

(21) Appl. No.: 12/376,448

(22) PCT Filed: Aug. 30, 2007

(86) PCT No.: PCT/EP2007/059056
§ 371 (c)(1),
(2), (4) Date: Feb. 5, 2009

(87) PCT Pub. No.: WO2008/025823
PCT Pub. Date: Mar. 6, 2008

(65) Prior Publication Data
US 2010/0196229 A1    Aug. 5, 2010

(30) Foreign Application Priority Data

Aug. 31, 2006   (FR) .................... 06 53535

(51) Int. Cl.
*C01F 13/00* (2006.01)
*C01F 15/00* (2006.01)
*C01G 43/00* (2006.01)
*C01G 56/00* (2006.01)

(52) U.S. Cl.
USPC .................. 423/2; 423/3

(58) Field of Classification Search .............. None
See application file for complete search history.

(56) References Cited

U.S. PATENT DOCUMENTS

| 3,045,984 | A | * | 7/1962 | Cochran | 366/340 |
| 3,147,292 | A |  | 9/1964 | Clelland et al. |  |
| 4,464,341 | A |  | 8/1984 | Auchapt et al. |  |
| 5,262,063 | A | * | 11/1993 | Yen | 210/724 |

FOREIGN PATENT DOCUMENTS

| EP | 0 072 737 A1 | 2/1983 |
| EP | 0 251 399 A1 | 1/1988 |
| EP | 0 434 557 A1 | 6/1991 |
| EP | 0 543 552 A1 | 5/1993 |
| FR | 0 251 399 A1 | 1/1988 |
| FR | 0 434 557 A1 | 12/1994 |
| JP | 05-200260 A | 10/1993 |

OTHER PUBLICATIONS

Lu et al(Emulsion Precipitation of Submicron Zinc Oxide Powder, Material Letters 33(1997) 129-132.*
International Search Report for PCT/EP2007/059056, dated Feb. 1, 2008.

* cited by examiner

*Primary Examiner* — Emily Le
*Assistant Examiner* — Michael Forrest
(74) *Attorney, Agent, or Firm* — Pearne & Gordon LLP

(57) ABSTRACT

A precipitator comprises a counter-current circulation between the reacting substances (8, 6, 7 →12) and a non-miscible and chemically inert organic confinement phase (10→9) to maintain the phase containing the reagent in an emulsion. The walls of the precipitator are hydrophobic to prevent the adhesion of the precipitate. The emulsion is maintained by a mobile stirrer body (2). The precipitate is removed continually by a scavenging flow rate device (16).

9 Claims, 2 Drawing Sheets

SOLUTE PRECIPITATION METHOD AND DEVICE

Figure 1:
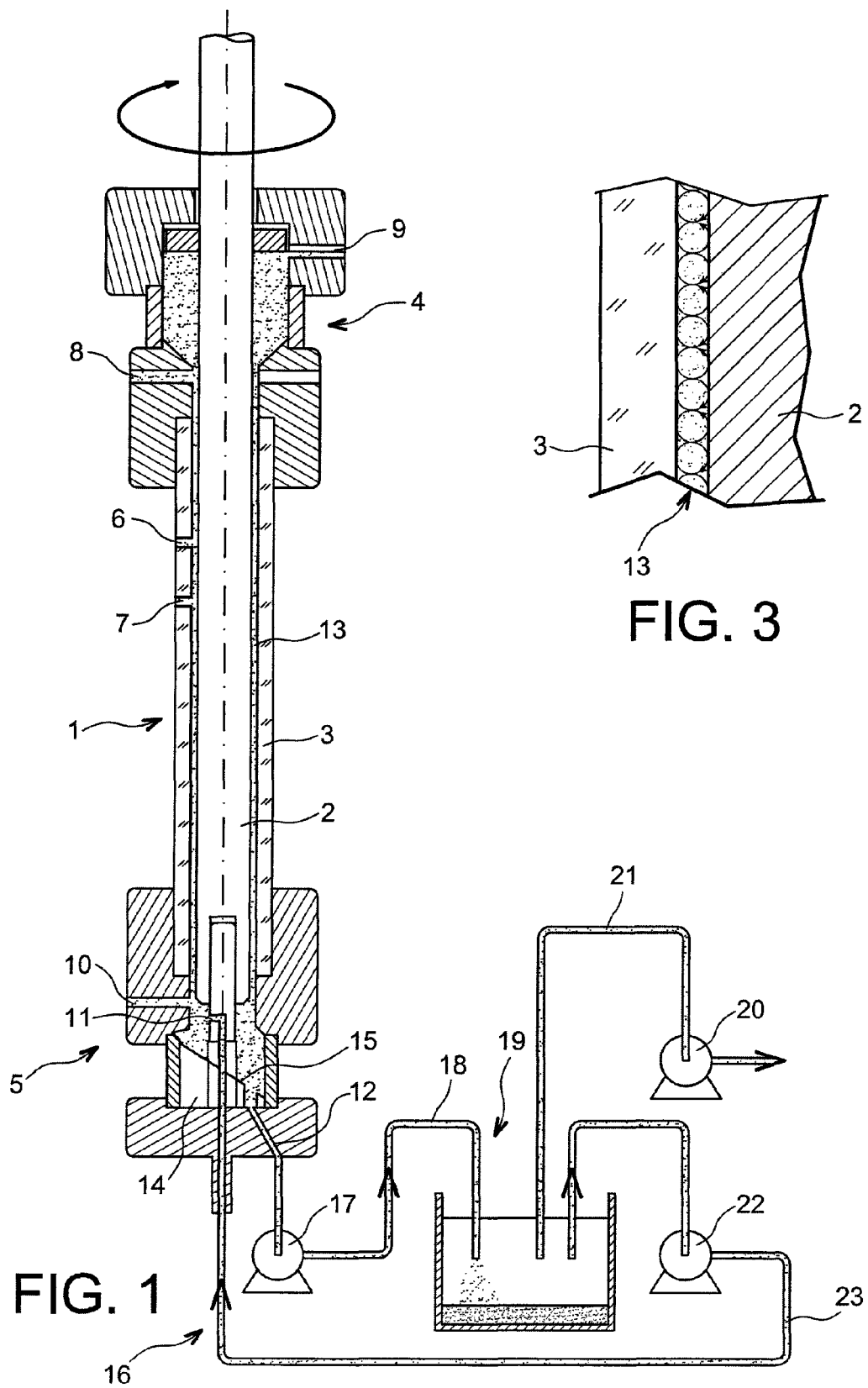

The invention relates to a method and a device for the precipitation of one or more solutes.

It may be used, among other things, to recover uranium or plutonium firstly present in the form of uranium or plutonium nitrate in an aqueous phase, by mixing said first liquid phase with a second liquid phase of oxalic acid also in aqueous solution, which gives a uranium or plutonium oxalate precipitate which is then recovered. It may also be used in similar applications, such as the precipitation of neodymium oxalate, or in different applications where the same problems occur.

One problem of these methods stems from the adhesive nature of the precipitate, an excessive proportion whereof remains adherent to the walls of the vessel wherein the mixing is carried out. Another problem of these methods is that it is difficult to adjust the grain size of the precipitate obtained.

The related prior art is plentiful. The precipitators used are of three main types. The first comprises a glass vessel wherein the contents are stirred by rotating a lower bar, which creates a vortex with the dual function of keeping the precipitate at a distance from the glass walls, and therefore preventing adhesion thereon, and ensuring a sufficient holding time to enable the growth of the grains of the precipitate in order to render it less adhesive. The precipitate is evacuated continuously by means of overflow from the vessel.

Another type of precipitator comprises a rotating bowl wherein the confinement of the precipitate is also carried out by forming a vortex. The precipitate is evacuated by rising in channels by means of centrifugal force.

Another type of precipitator is a column. Stirring is carried out by means of ultrasound which also mixes the two phases. The precipitate is evacuated at the base of the vessel via a bubble elevator.

The method is achieved in these different precipitators by mixing the aqueous phase containing the solute to be precipitated and the aqueous phase containing the precipitation reagent directly. In another group of methods, that can be used with the same precipitators, the solute is present in a solvent and the aqueous phase containing the reagent also carries out the partitioning of the solvent; the same problems associated with precipitate adhesion on the walls of the precipitator are found. Unfortunately, the holding time of the precipitate in the vessel, which would be tempting to extend to obtain larger grains, is difficult to control. Several of these methods are incompatible with continuous precipitate evacuation, the precipitate being evacuated after a sufficient volume has been obtained at the bottom of the precipitator. Finally, not all make it possible to handle high reagent flow rates.

A complete method to precipitate and recover plutonium oxalate is described, in the French patent 1 378 933. The European patent 0 251 399 should also be mentioned to illustrate a method of the same type, where, in addition, the plutonium-charged organic phase is also washed using an aqueous solution in order to separate the plutonium from the americium before precipitation. As seen below, the present invention comprises the use of an additional organic phase, but which is used under different circumstances, in the presence of the two aqueous phases comprising plutonium and the reagent, for the purposes of the confinement of the precipitate under specific flow conditions in the precipitator.

The U.S. Pat. No. 3,147,292 illustrates the use of an aqueous solution to wash the precipitate in a column downstream from the precipitator, by circulating, against the flow of the aqueous solution, the liquid phase containing the precipitate.

The French patent 0 434 557 illustrates a device where gas bubbling tubes measure the level of precipitate floating at the interface between the settled heavy and light phases.

The British patent 960 652 illustrates the use of a stirring rotor in a precipitator.

A first aspect of the invention is a solute precipitation method, comprising mixing in a vessel of a liquid phase containing the solute and a second liquid phase containing a reagent causing the solute to precipitate, stirring of the mixture and removal of the precipitate, characterised in that it comprises confinement of the mixture in emulsion in a third, chemically inert, liquid phase, non-miscible with the first liquid phase and the second liquid phase.

A second essential aspect is a solute precipitation device, comprising a vessel, inlet orifices of a first liquid phase containing the solute and a second liquid phase containing the reagent causing the solute to precipitate, an outlet orifice of the first liquid phase and the second liquid phase, stirring means of an internal volume in the vessel, comprising an inlet orifice of a third liquid phase, characterised by hydrophobic coatings on surfaces delimiting the internal volume in the vessel.

Therefore, the main aims of the invention are to:
prevent the accumulation of the precipitate in the precipitator, particularly due to adhesion against the walls thereof;
obtain a favourable precipitate grain size distribution;
control the flow characteristics in the precipitator and flow rate characteristics through the precipitator;
continually remove the precipitate, and more generally obtain regular operation of the device.

This should be obtained with a simple precipitator structure.

The first aim will be achieved by means of hydrophobic coatings of the walls of the precipitator and specific flow qualities.

The second aim, by means of specific flow qualities and progressive precipitate formation.

The third aim, by means of a suitable choice of the size and shapes of the precipitator vessel and particularly by means of the choice of an elongated vessel where liquid circulation may be set up; and by means of the use of an additional phase, referred to as the organic phase in the examples given below and circulating against the flow of the aqueous phases.

The fourth aim, by means of the use of a scavenging circuit of the bottom of the vessel, where the precipitate accumulates.

Figure 2:
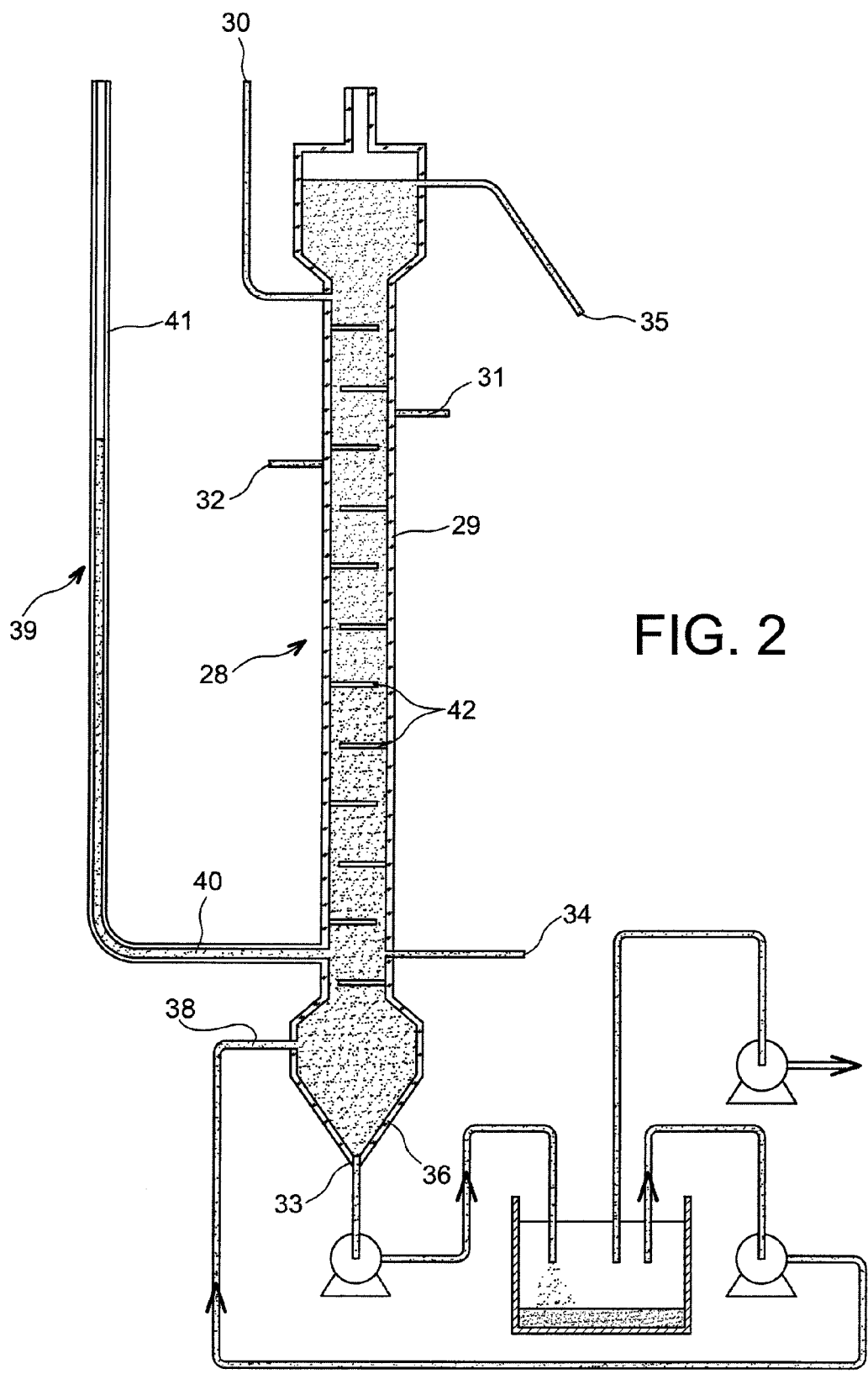

The invention will now be described with reference to the figures, wherein:

FIGS. 1 and 2 illustrate two embodiments of the invention, and FIG. 3 is an enlargement of FIG. 1.

FIG. 1 represents a first claim of the invention. The precipitator 1 is a column-shaped vessel at the centre whereof a rotor 2 rotates. The precipitator is delimited by a glass tube 3 vertically oriented at the centre, and, at the two ends thereof, by an upper end fitting 4 and a lower end fitting 5 wherein the rotor 2 rotates. The tube 3 comprises a first aqueous phase inlet 6 and a second aqueous phase inlet 7, both containing the solute to be precipitated (such as a plutonium nitrate solution), defined at different heights in the tube 3 not far from the upper end fitting 4. The upper end fitting 4 comprises an aqueous phase inlet 8 containing a reagent creating precipitation (such as oxalic acid in solution) and above same, an organic phase overflow 9. The lower end fitting 5 comprises an organic phase (which may be hydrogenated tetrapropylene) inlet 10, and, below same, a scavenging aqueous phase inlet 11 and outlet 12. The inlets and outlets 6, 7, 8, 10 are in communication with an annular space 13 between the tube 3 and the rotor 2, wherein the precipitation takes place as the reagent aqueous phase is mixed with the solute aqueous phase, the aqueous phases descending along the tube 3. The organic phase flows against the flow of the aqueous phases and rises from the inlet 10 to the overflow 9. The flow rate of the organic phase with respect to the aqueous phases, the width of the annular space 13 and the rotation speed of the rotor 2 are adjusted so as to establish a Couette flow wherein axial and radial movement counterrotating Taylor cylinders (illustrated in FIG. 3) are aligned in the annular space 13 and confine the aqueous phases in emulsion droplets included in the organic phase. These droplets tend to remain in a specific cylinder, with a vortex flow which lowers them gradually into the annular space 13 while continually moving away from and approaching the rotor 2 and the tube 3. The precipitate is formed and remains in these droplets without a significant possibility of coming into contact with the walls of the rotor 2 and the tube 3 which delimit the annular space 13 or adhering to each other. The growth of the grains of the precipitate is carried out in these droplets, wherein coalescence is prevented by the stability of the flow and the absence of migration of the solutes in the organic phase. The mixing of the aqueous phases and the formation of the precipitate are progressive also due to the stability of the flow, which helps keep the droplets separate. Finally, the turbulence maintains the emulsion. The first aqueous phase inlet 6 receives an aqueous phase wherein the solute content is lower than the second inlet 7, in order to inoculate the aqueous flow with precipitate and favour precipitation due to growth of the grains obtained by the inoculation when the more concentrated aqueous phase arrives via the second inlet 7. Finally, less numerous, more homogeneous and larger grains are obtained.

The bottom of the vessel is occupied by a solid part 14 on the inclined upper surface 15 at the bottom whereof the outlet orifice 12 of the scavenging aqueous phase opens. The aqueous phase lowers into the precipitator to the inclined upper surface 15. The precipitate slides to the outlet orifice 12 which opens into a recovery circuit 16. A first pump 17 takes up the aqueous phase and circulates it in a pipe 18 to a settling tank 19 at the bottom whereof the precipitate accumulates. A second pump 20 draws in the supernatant oxalic mother liquors into an outlet pipe 21. A third pump 22 draws in the remainder of the aqueous phase into a recycling pipe 23 leading via the pipe 16 to the inlet orifice 11 of the scavenging aqueous phase.

The surface of the rotor 2 and the inner surface of the casing 3 are coated with a hydrophobic material in order to oppose the contact of the aqueous phases containing the precipitate and thus the adhesion thereof. Suitable coatings are polytetrafluoroethylene (one brand name whereof is Teflon®) for metallic surfaces or a coating from a silanisation treatment for glass walls. This treatment consists, after stripping of the glass and activation with a sodium hydroxide solution (3 to 10 M NaOH), of grafting a layer of alkyl group hydrophobic molecules by means of contact with a hydrophobic silane. The hydrophobic silane used in this case is ODTMOS (octadecyltrimethoxysilane).

Pre-inoculation of the aqueous flow via the staged aqueous phase inlet orifices 6 and 7 also reduces the risks of adhesion of the precipitate due to the formation of fine grains in the pre-inoculation step, around which the remainder of the precipitate is formed more easily.

Finally, the use of a non-miscible organic phase with which the aqueous phase forms an emulsion without mixing with same favours the confinement of the precipitate in aqueous phase droplets. It is endeavoured to obtain a flow structured in Taylor cylinders for the reasons given above.

The use of an upward organic phase flow that may be recycled via the inlet 10 makes it possible to slow down the descent of the aqueous phase, and favour the agglomeration of the precipitate in larger and more homogeneous grains.

An alternative embodiment of the method may be obtained by introducing the solute to be precipitated in the solvent rather than in an aqueous phase and to perform precipitating partitioning. The solvent may be 30% by volume tributylphosphate in hydrogenated tetrapropylene charged with plutonium, by applying the conditions in document EP 0 251 399. The rest of the method is unchanged.

Finally, the recycling of the aqueous phase in a circuit consisting of the pipes 18 and 23, at a higher flow rate than the aqueous flow rate feeding the precipitator, scavenges the lower part of the precipitator which favours the outlet on time of the precipitate and the recycling of the aqueous phase.

An alternative embodiment of the invention will be described using FIG. 2.

The precipitator 28 is devoid of a rotor and in this case comprises a single casing 29. An inlet orifice 30 of an aqueous solution comprising the reagent, a first inlet orifice 31 of an aqueous phase comprising the solute to be precipitated, a second inlet orifice 32 of an aqueous phase containing the solute, an aqueous phase outlet orifice 33, an organic phase inlet orifice 34 and an organic phase outlet orifice 35. The orifices 35, 30, 31, 32, 34 and 33 follow each other in this order from the top to the bottom of the casing 29. The casing 29 is the shape of a vertical column, cylindrical in the median part thereof, expanded at the top above the inlet orifice 30 of the aqueous phase containing the reagent to allow the precipitate to settle in the organic phase and expanded at the bottom to allow the aqueous phase containing the precipitate to settle, below the organic phase inlet orifice 34. The lower end of said settling tank is however in the shape of a funnel 36 where the precipitate accumulates. The aqueous phase outlet orifice 33 opens into a recycling circuit similar to that of the previous embodiment and which ends on a return orifice 38.

The essential element of this embodiment is the manner wherein the stirring is created by a pulsation member 39 comprising a horizontal lower portion 40 opening opposite the organic phase inlet orifice 34 and an upper portion 41 forming a bend with the previous and rising parallel with the casing 29 to open via an upper orifice onto a pulsation device of the type of those commonly used to pulse liquid-liquid extraction columns using a compressed gas. In addition, horizontal platforms 42 extend in the casing 29 requiring the fluids to complete zigzag trajectories. The platforms 42 and the casing 29 are also coated with a hydrophobic coating in this embodiment. The stirring creating the emulsion is in this case instigated by the pulsations of the liquid in the member 39.

The method for the formation of the emulsion, formation of the precipitate with progressive grain growth, and confinement of the aqueous phase in droplets in the organic phase is identical to that of the previous embodiment. The same applies for the progressive evaluation of the precipitate by the high-output scavenging circuit.

The counter-current circulation is also created in this case by selecting a less dense organic phase than the aqueous phases, the pulsation member 39 helping form an emulsion with progressive placing in contact of the two aqueous phases.

The velocity of the flow, which affects the grain size of the precipitate, depends on the flow rate of the upward organic phase, which the user is free to choose.

In one alternative embodiment of the method, the first liquid phase is introduced at several separate flow rates in the vessel, the separate flow rates having different solute contents, and being introduced at different points of the solute, the separate flow rates having a lower solute content being introduced preferentially in the first direction.

In one alternative embodiment of the device, the inlet orifices of the first liquid phase and the second liquid phase are located on a first side of the vessel and the outlet orifice of the first liquid phase and the second liquid phase and the inlet orifice of the third liquid phase are located on the second side of the vessel opposite the first side.

In another alternative embodiment, the stirring device and the circulation device of the third liquid phase may be adjusted to obtain the desired grain size distribution for the precipitate.

The invention claimed is:

1. A precipitation method of at least one solute, comprising:
    mixing of a first liquid phase containing the solute and a second liquid phase containing a reagent causing the solute to precipitate in a vessel,
    stirring of the mixture and removal of the precipitate,
    confining the mixture in emulsion in a third, chemically inert, liquid phase, non-miscible with the first liquid phase and the second liquid phase,
    the first liquid phase and the second liquid phase circulating in the vessel in a first direction, and
    the third liquid phase circulating in the vessel in a second direction opposite the first direction,
    wherein the mixture is stirred by a stirrer mobile in the vessel, a space separating the stirrer and an internal wall of the vessel, a width of said space being adjusted to establish a flow comprising a plurality of vortices continuously moving away and approaching the stirrer and the internal wall of the vessel, the plurality of vortices being aligned in said space separating the stirrer and the internal wall of the vessel, the first liquid phase and second liquid phase being included as droplets inside the third liquid phase in the plurality of vortices.

2. The precipitation method of claim 1, wherein the stirrer and the internal wall of the vessel are coated with a hydrophobic coating.

3. The precipitation method of claim 1, wherein the precipitate is removed continually from the vessel by means of circulation in a loop of the mixture of the first and the second liquid phases in a circuit passing via the vessel.

4. The precipitation method of claim 1, wherein the first liquid phase is introduced at several separate flow rates in the vessel, the separate flow rates having different solute contents, and being introduced at different points of the solute, the separate flow rates having a lower solute content being introduced preferentially in the first direction.

5. The precipitation method of claim 1, comprising an adjustment of the flow rate of the third liquid phase in order to affect the grain size of the precipitate.

6. A precipitation method of at least one solute, comprising mixing of a liquid phase containing the solute and a second liquid phase containing a reagent causing the solute to precipitate in a vessel, stirring of the mixture and removal of the precipitate, confining the mixture in emulsion in a third, chemically inert, liquid phase, non-miscible with the first liquid phase and the second liquid phase, the first liquid phase and the second liquid phase circulating in the vessel in a first direction and the third liquid phase circulating in the vessel in a second direction opposite the first direction, wherein the vessel is a vertical column, the mixture is stirred by a static pulsation member opening in the vessel and facing an inlet of one of the phases into the vessel, and a zigzag flow is imposed to the mixture by platforms extending in the vessel, an internal wall of the vessel and the platforms being coated with a hydrophobic coating.

7. The precipitation method of claim 6, wherein the precipitate is removed continually from the vessel by means of circulation in a loop of the mixture of the first and the second liquid phases in a circuit passing via the vessel.

8. The precipitation method of claim 6, wherein the first liquid phase is introduced at several separate flow rates in the vessel, the separate flow rates having different solute contents, and being introduced at different points of the solute, the separate flow rates having a lower solute content being introduced preferentially in the first direction.

9. The precipitation method of claim 6, comprising an adjustment of the flow rate of the third liquid phase in order to affect the grain size of the precipitate.

* * * * *

UNITED STATES PATENT AND TRADEMARK OFFICE
CERTIFICATE OF CORRECTION

PATENT NO. : 8,431,097 B2
APPLICATION NO. : 12/376448
DATED : April 30, 2013
INVENTOR(S) : Gilles Borda et al.

Page 1 of 1

It is certified that error appears in the above-identified patent and that said Letters Patent is hereby corrected as shown below:

On the Title page, (75) Inventors, after Gilles Borda please delete "Bagnois" and add -- Bagnols --

On the Title page, (75) Inventors, after Jean Duhamet please delete "Bagnois" and add -- Bagnols --

Signed and Sealed this
Twelfth Day of November, 2013

Teresa Stanek Rea
*Deputy Director of the United States Patent and Trademark Office*